United States Patent
Kuhn et al.

(10) Patent No.: US 11,268,426 B2
(45) Date of Patent: Mar. 8, 2022

(54) SENSOR SHIELD PORT FOR EXHAUST TREATMENT SYSTEMS OF WORK VEHICLES

(71) Applicant: CNH Industrial America LLC, New Holland, PA (US)

(72) Inventors: Frederic G. Kuhn, Kiel, WI (US); Lawrence R. Borucki, Jr., Oostburg, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/210,658

(22) Filed: Mar. 24, 2021

(65) Prior Publication Data
US 2021/0310399 A1    Oct. 7, 2021

Related U.S. Application Data

(60) Provisional application No. 63/006,184, filed on Apr. 7, 2020.

(51) Int. Cl.
*F01N 13/00*    (2010.01)
*F01N 3/20*     (2006.01)

(52) U.S. Cl.
CPC .......... *F01N 13/008* (2013.01); *F01N 3/2066* (2013.01); *F01N 2560/026* (2013.01)

(58) Field of Classification Search
CPC combination set(s) only.
See application file for complete search history.

(56) References Cited

U.S. PATENT DOCUMENTS

| | | | |
|---|---|---|---|
| 4,199,424 A * | 4/1980 | Teitelbaum | G01N 27/4077 204/428 |
| 4,597,850 A | 7/1986 | Takahasi et al. | |
| 5,049,255 A | 9/1991 | Wolfe et al. | |
| 5,073,247 A | 12/1991 | Weyl | |
| (Continued) | | | |

FOREIGN PATENT DOCUMENTS

CN    105697111 A    6/2016

OTHER PUBLICATIONS

Carley, "Oxygen Sensors: How to Diagnose and Replace", AA1Car Automotive Diagnostic Repair Help, dated 2019. (13 pages) https://www.aa1car.com/library/o2sensor.htm.

(Continued)

*Primary Examiner* — Binh Q Tran
(74) *Attorney, Agent, or Firm* — Rebecca L. Henkel; Rickard K. DeMille

(57) ABSTRACT

A sensor assembly for use within a flow conduit includes a sensor shield port extending between inner and outer ends of the sensor shield port through a wall of the flow conduit. The sensor shield port includes a port body defining a bore and extending between inner and outer surfaces of the port body. The sensor shield port further includes an outer port wall extending from the outer surface of the port body towards the outer end of the sensor shield port and an inner port wall extending from the inner surface of the port body. The sensor shield port includes one or more tabs extending from the inner port wall towards the inner end of the sensor shield port. The sensor assembly further includes an exhaust sensor inserted and removably coupled within the bore of the sensor shield port.

20 Claims, 7 Drawing Sheets

(56) References Cited

U.S. PATENT DOCUMENTS

| | | | |
|---|---|---|---|
| 6,182,498 | B1 | 2/2001 | Mizutani et al. |
| 6,843,105 | B1 | 1/2005 | France |
| 8,225,648 | B2 * | 7/2012 | Nelson ............... G01N 15/0656 73/114.71 |
| 8,966,965 | B2 | 3/2015 | Driscoll et al. |
| 9,382,832 | B2 * | 7/2016 | Bowers .................. F01N 13/14 |
| 10,934,923 | B2 * | 3/2021 | Hudgens ............. B60R 16/0215 |
| 11,098,629 | B2 * | 8/2021 | Singh ...................... F01N 11/00 |
| 2004/0168914 | A1 | 9/2004 | Reidmeyer et al. |
| 2008/0209984 | A1 * | 9/2008 | Yamada ............. G01N 27/4077 73/31.05 |
| 2010/0158758 | A1 * | 6/2010 | Gustin ............... G01N 33/0013 422/83 |
| 2014/0144208 | A1 | 5/2014 | Allmendinger et al. |
| 2016/0305297 | A1 | 10/2016 | Wadke et al. |
| 2019/0101041 | A1 * | 4/2019 | Willats ................ B01D 53/944 |

OTHER PUBLICATIONS

"Oxygen Sensor Shield", TheSamba.com, VW Forum, dated Oct. 3, 2012. (7 pages) https://www.thesamba.com/vw/forum/viewtopic.php?t=530212&start=0.

* cited by examiner

SENSOR SHIELD PORT FOR EXHAUST TREATMENT SYSTEMS OF WORK VEHICLES

CROSS-REFERENCE TO RELATED APPLICATIONS

The present application is based upon and claims the right of priority to U.S. Provisional Patent Application No. 63/006,184, filed Apr. 7, 2020, the disclosure of which is hereby incorporated by reference herein in its entirety for all purposes.

FIELD

The present subject matter relates generally to the treatment of engine exhaust gases generated by work vehicles and, more particularly, to a sensor shield port for use within exhaust treatment systems of work vehicles for increasing the accuracy or reliability of and preventing damage to an associated exhaust sensor.

BACKGROUND

Typically, work vehicles, such as tractors and other agricultural vehicles, include an exhaust treatment system for controlling engine emissions. As is generally understood, exhaust treatment systems for work vehicles often include a diesel oxidation catalyst (DOC) system in fluid communication with a selective catalytic reduction (SCR) system. The DOC system is generally configured to oxidize carbon monoxide and unburnt hydrocarbons contained within the engine exhaust and may include a mixing chamber for mixing an exhaust reductant, such as a diesel exhaust fluid (DEF) or any other suitable urea-based fluid, into the engine exhaust. For instance, the exhaust reductant is often pumped from a reductant tank mounted on and/or within the vehicle and injected onto the mixing chamber to mix the reductant with the engine exhaust. The resulting mixture may then be supplied to the SCR system to allow the reductant to be reacted with a catalyst in order to reduce the amount of nitrous oxide (NOx) emissions contained within the engine exhaust. A NOx sensor is typically positioned downstream of the SCR system to monitor the amount of NOx emissions still remaining in the exhaust flow exiting the exhaust treatment system. The data from the sensor may, for example, be used to control the combustion temperature of the engine and/or the amount of reductant injected into the mixing chamber to ensure that the amount of NOx emissions remains below a given amount.

Many SCR systems include multiple different catalyst lines, which are combined upstream of the NOx sensor. However, in many instances, the engine exhaust may not be fully mixed before encountering the NOx sensor. As such, the NOx sensor may underestimate or overestimate a concentration of NOx within the exhaust gas associated with the exhaust treatment system. Overestimating the amount of NOx within the engine exhaust may result in an excessive amount of the reductant being injected into the engine exhaust. This can lead to clogging of the catalyst lines, increased reductant consumption, higher backpressure within the exhaust treatment system, and/or increased ammonia slip within the exhaust treatment system. Contrarily, injecting an inadequate amount of the reductant may lead to excessive NOx emissions contained within the engine exhaust gas. Additionally, the exhaust gas my contain liquid droplets that can impinge on the NOx sensor and cause damage to the NOx sensor or negatively affect the performance of the NOx sensor, such as lowering the accuracy of the NOx sensor.

Accordingly, an improved sensor assembly that increases the accuracy of an exhaust sensor positioned within a flow conduit of an exhaust treatment system would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a sensor assembly for use within a flow conduit of an exhaust treatment system of a work vehicle. The flow conduit includes an upstream end and a downstream end and is configured to receive a treated exhaust at the upstream end for flow towards the downstream end. The sensor assembly includes a sensor shield port extending in a longitudinal direction between an inner end of the sensor shield port and an outer end of the sensor shield port. The sensor shield port extends through a wall of the flow conduit between the inner and outer ends such that an inner portion of the sensor shield port is positioned within the flow conduit at a location between the upstream and downstream ends. The sensor shield port includes a port body coupled to the wall of the flow conduit and extending in the longitudinal direction from an outer surface of the port body to an inner surface of the part body. The port body defines a bore extending in the longitudinal direction from the outer surface to the inner surface. The sensor shield port further includes an outer port wall extending from the outer surface of the port body in the longitudinal direction towards the outer end of the sensor shield port such that at least a portion of the outer port wall is positioned exterior of the flow conduit. The sensor shield port also includes an inner port wall extending from the inner surface of the port body in the longitudinal direction such that at least a portion of the inner port wall is positioned within an interior of the flow conduit. Additionally, the sensor shield port includes one or more tabs extending from the inner port wall in the longitudinal direction towards the inner end of the sensor shield port. The sensor assembly further includes an exhaust sensor inserted within the bore of the sensor shield port. Particularly, the exhaust sensor is removably coupled to the sensor shield port at the bore. Moreover, the exhaust sensor is configured to detect an amount of an emission gas present in the treated exhaust.

In another aspect, the present subject matter is directed to an exhaust treatment system for a work vehicle. The exhaust treatment system includes a selective catalytic reduction (SCR) system configured to react a mixture of exhaust reductant and engine exhaust with a catalyst to generate a treated exhaust. The SCR system further includes an SCR outlet for expelling the treated exhaust therefrom. The exhaust treatment system also includes a flow conduit including an upstream end and a downstream end, the flow conduit in fluid communication with the SCR outlet for receiving the treated exhaust expelled from the SCR system. Additionally, the exhaust treatment system includes a sensor shield port extending in a longitudinal direction between an inner end of the sensor shield port and an outer end of the sensor shield port. The sensor shield port extends through a wall of the flow conduit between the inner and outer ends such that an inner portion of the sensor shield port is positioned within the flow conduit at a location between the upstream and downstream ends. The sensor shield port includes a port body coupled to the wall of the flow conduit and extending in the longitudinal direction from an outer surface of the port body to an inner surface of the part body. The port body defines a bore extending in the longitudinal direction from the outer surface to the inner surface. The sensor shield port further includes an outer port wall extending from the outer surface of the port body in the longitudinal direction towards the outer end of the sensor shield port such that at least a portion of the outer port wall is positioned exterior of the flow conduit. The sensor shield port also includes an inner port wall extending from the inner surface of the port body in the longitudinal direction such that at least a portion of the inner port wall is positioned within an interior of the flow conduit. Additionally, the sensor shield port includes one or more tabs extending from the inner port wall in the longitudinal direction towards the inner end of the sensor shield port. The exhaust treatment system further includes an exhaust sensor inserted within the bore of the sensor shield port. Particularly, the exhaust sensor is removably coupled to the sensor shield port at the bore. Moreover, the exhaust sensor is configured to detect an amount of an emission gas present in the treated exhaust.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
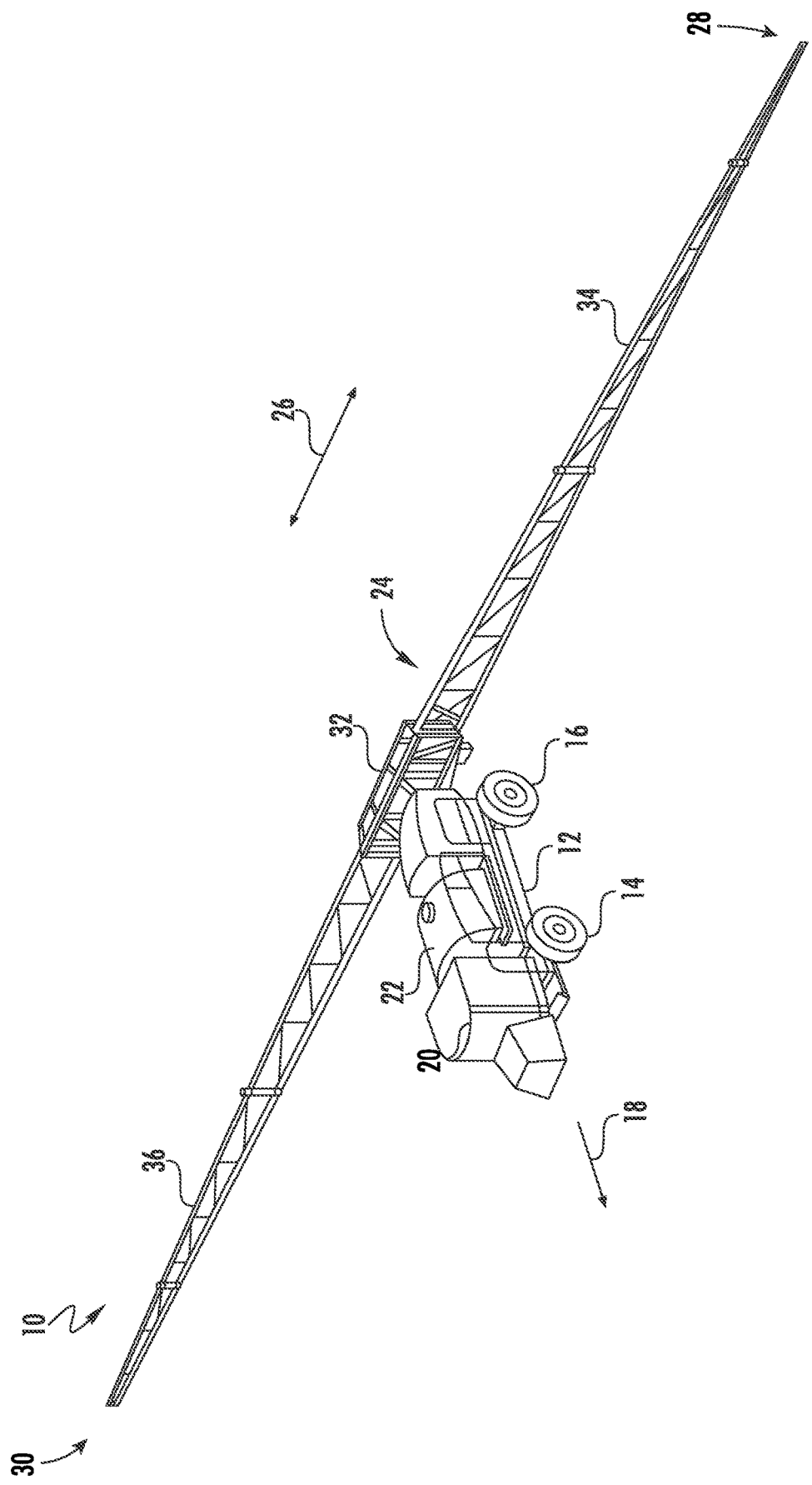
FIG. 1 illustrates a perspective view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a sensor assembly suitable for use within a fluid conduit of an exhaust treatment system for a work vehicle. The flow conduit generally includes upstream and downstream ends and is configured to receive a treated exhaust at the upstream end and flow such treated gas towards the downstream end. The sensor assembly includes a sensor shield port extending through a wall of the flow conduit between the upstream and downstream ends. The sensor shield port extends between an inner end and an outer end and includes a port body attached to the wall of the flow conduit. The port body further extends between an inner surface and an outer surface and defines a bore extending between the inner and outer surfaces. An outer port wall of the sensor shield port extends from the outer surface of the port body such that at least a portion of the outer port wall is positioned exterior to the flow conduit. An inner port wall of the sensor shield port extends from the inner surface of the port body such that at least a portion of the inner port wall is positioned with an interior of the flow conduit. Further, the sensor shield port includes one or more tabs, such as an upstream tab and a downstream tab, extending from the inner port wall towards the inner end of the sensor shield port.

The sensor assembly also includes an exhaust sensor configured to be inserted within the bore of the sensor shield port. Specifically, in several embodiments, the exhaust sensor is removably coupled to the sensor shield port at the bore. The exhaust sensor is configured to detect an amount of an emission gas present in the treated exhaust, such as an amount of NOx contained within the treated exhaust. The disclosed sensor shield port may provide numerous advantages to the operation of the exhaust sensor, some of which are detailed below.

The sensor shield port is positioned relative to the flow conduit such that treated exhaust of an associated exhaust treatment system must generally impact the tab(s), e.g., the upstream tab, of the sensor shield port before encountering the exhaust sensor. Additionally, the sensor shield port may be configured to create a wake area downstream of the tab(s). Thus, a turbulent exhaust flow is generated as the treated exhaust is directed past the tab(s), with the turbulent exhaust flow from the wake area being subsequently encountered by the exhaust sensor. As such, the treated exhaust encountering the exhaust sensor may be mixed in order to form a more homogenous turbulent exhaust as compared to the treated exhaust. Furthermore, liquid particles contained within the treated exhaust may impinge upon the tab(s) rather than directly impinging on the exhaust sensor. Additionally, or alternatively, treated exhaust may be simultaneously accelerated and/or turned as it flows around the tab(s) towards the wake area. Such acceleration and turning may shed liquid particles contained within the treated exhaust.

By more effectively mixing the treated exhaust encountering the exhaust sensor, the sensor readings from such exhaust sensor may more accurately represent harmful or undesirable gas emissions within the treated exhaust flow as a whole. Furthermore, an associated controller may implement a control action, such as adjusting the combustion temperature of the engine and/or varying the amount of reductant injected into the exhaust treatment system, based on a more accurately determined amount of exhaust emissions contained within the treated exhaust flow. As such, the disadvantages associated with inaccurate emissions readings may be reduced or eliminated. For instance, overestimation of the amount of emissions within the exhaust flow may be avoided and thus prevent or reduce the amount of reductant injected in response. Several issues associated with excessive reductant injection may thus be avoided, such as clogging of the catalyst lines, increased reductant consumption, higher backpressure within the exhaust treatment system, and/or increased ammonia slip within the exhaust treatment system. Similarly, issues associated with inadequate reductant injection in response to underestimation of the amount of emissions within the engine exhaust flow may similarly be avoided, such as excessive NOx emissions contained within the treated exhaust flow.

In addition, by impinging liquid droplets on the tab(s) of the sensor shield port and/or shedding liquid droplets within the treated exhaust encountering the exhaust sensor, the likelihood of such liquid droplets impinging on or otherwise contacting the exhaust sensor may be reduced and thus, by extension, substantially reduce a likelihood of sensor failure or damage due to liquid droplets impinging on or otherwise contacting the exhaust sensor.

Furthermore, it is sometimes desirable to clean an area of the work vehicle surrounding an exhaust pipe of an associated exhaust treatment system. During such a cleaning procedure, pressurized fluid may inadvertently or intentionally be sprayed within the exhaust pipe. Thus, such pressurized fluid may encounter an unshielded exhaust sensor and cause damage to the exhaust sensor, which may negatively impact the performance of the exhaust sensor. The sensor shield port may be positioned such that a pressurized liquid sprayed within the exhaust pipe may generally impact the tab(s), e.g., the downstream tab, rather than directly impacting the exhaust sensor. By avoiding directly spraying the exhaust sensor, damage due to the pressurized fluid may be avoided or reduced. Furthermore, it is possible to damage an exhaust sensor due to a temperature difference between a hot exhaust sensor after operation of a work vehicle and a relatively cool liquid sprayed within the exhaust pipe. Thus, embodiments of the disclosed sensor shield port may further reduce and amount of contact between the exhaust sensor and liquid sprayed within the tailpipe and thus, by extension, substantially reduce a likelihood of sensor failure or damage due to liquid droplets impinging on or otherwise contacting the exhaust sensor.

Furthermore, embodiments of the disclosed sensor assembly promote easy insertion and removal of the exhaust sensor at a desirable orientation relative to the sensor shield port. For instance, in one embodiment, the sensor shield port is permanently coupled to the wall of the flow conduit, such as via welding, and the exhaust sensor is removably coupled to the exhaust sensor port, such as via threading or a threaded connection. Moreover, the sensor shield port may be oriented within the flow conduit in order to: provide a desirable orientation and position of the exhaust sensor relative to the sensor shield port and thus promote mixing of the treated exhaust encountering the exhaust sensor; avoid direct impact of liquid particles within the treated exhaust on the exhaust sensor; and/or avoid impingement of liquid sprayed within an exhaust pipe on the exhaust sensor. Thus, the presently disclosed sensor shield assembly may provide the advantage of a one step process for removing and/or inserting an exhaust sensor within an associated flow conduit without the need to assemble multiple other components and ensure a proper orientation of shielding components relative to the treated exhaust flow and the exhaust sensor. Furthermore, the time required to insert, remove, repair, replace, or clean associated exhaust sensors may be drastically reduced. Additionally, the outer port wall may be sized such that tools employed to thread the exhaust sensor within the sensor shield may be easily utilized.

Furthermore, a suitable sensor shield port as described herein may be a simple addition to the assembly process of exhaust treatment systems and/or may easily be installed into preexisting exhaust treatment systems. For instance, several embodiments of the disclosed sensor shield port may be easily manufactured and assembled and have minimal spacing requirements within the flow conduit. Additionally, the tab(s) of the sensor shield port may have a very small cross-sectional footprint within the flow conduit and thus have minimal effects on the system backpressure.

Figure 2:
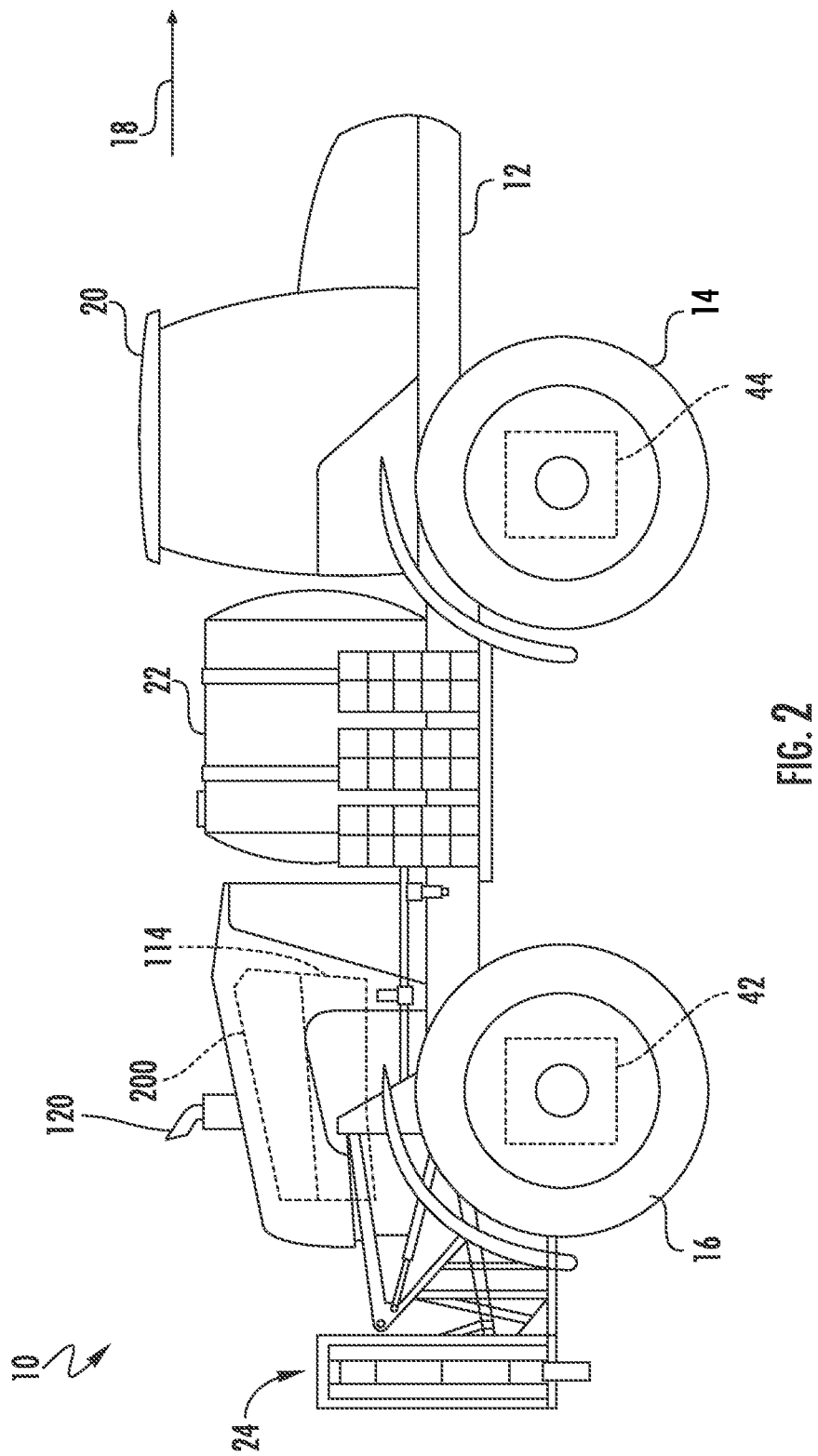
FIG. 2 illustrates a side view of the work vehicle shown in FIG. 1, particularly illustrating various components thereof.

Referring now to the drawings, FIGS. 1 and 2 illustrate differing views of one embodiment of work vehicle 10 in accordance with aspects of the present subject matter. Specifically, FIG. 1 illustrates a perspective view of the work vehicle 10. Additionally, FIG. 2 illustrates a side view of the work vehicle 10, particularly illustrating various components of the work vehicle 10.

In the illustrated embodiment, the work vehicle 10 is configured as a self-propelled agricultural sprayer. However, in alternative embodiments, the work vehicle 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like). Further, in other embodiments, the work vehicle 10 may be configured as any other suitable work vehicle known in the art, such as various other agricultural vehicles, agricultural tractors, earth-moving vehicles, road vehicles, all-terrain vehicles, off-road vehicles, loaders, and/or the like.

As shown in FIGS. 1 and 2, the work vehicle 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the work vehicle 10 relative to the ground and move the work vehicle 10 in a direction of travel 18 across the field. Furthermore, the frame 12 may support an operator's cab 20 and a tank 22 configured to store or hold an agricultural fluid, such as a pesticide (e.g., a herbicide, an insecticide, a rodenticide, and/or the like), a fertilizer, or a nutrient. However, in alternative embodiments, the work vehicle 10 may include any other suitable configuration. For example, in one embodiment, the front wheels 14 of the work vehicle 10 may be driven in addition to or in lieu of the rear wheels 16.

Additionally, the work vehicle 10 may include a boom assembly 24 mounted on the frame 12. In general, the boom assembly 24 may extend in a lateral direction 26 between a first lateral end 28 and a second lateral end 30. In one embodiment, the boom assembly 24 may include a center section 32 and one or more pairs of wing sections. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. A plurality of nozzles may be mounted on the boom assembly 24 and configured to dispense the agricultural fluid stored in the tank 22 onto the underlying plants and/or soil. However, in alternative embodiments, the boom assembly 24 may include any other suitable configuration.

Referring particularly to FIG. 2, the work vehicle 10 may include one or more devices or components for adjusting the speed at which the work vehicle 10 moves across the field in the direction of travel 18. Specifically, in several embodiments, the work vehicle 10 may include an engine 114 and a transmission 42 mounted on the frame 12. In general, the engine 114 may be configured to generate power by combusting or otherwise burning a mixture of air and fuel. The transmission 42 may, in turn, be operably coupled to the engine 114 and may provide variably adjusted gear ratios for transferring the power generated by the engine 114 to the driven wheels 16. For example, increasing the power output by the engine 114 (e.g., by increasing the fuel flow to the engine 114) and/or shifting the transmission 42 into a higher gear may increase the speed at which the work vehicle 10 moves across the field. Conversely, decreasing the power output by the engine 114 (e.g., by decreasing the fuel flow to the engine 114) and/or shifting the transmission 42 into a lower gear may decrease the speed at which the work vehicle 10 moves across the field.

Additionally, the work vehicle 10 may include one or more braking actuators 44 that, when activated, reduce the speed at which the work vehicle 10 moves across the field, such as by converting energy associated with the movement of the work vehicle 10 into heat. For example, in one embodiment, the braking actuator(s) 44 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the braking actuator(s) 44 may any other suitable hydraulic, pneumatic, mechanical, and/or electrical component(s) configured to convert the rotation of the rotating element(s) into heat. Furthermore, although FIG. 2 illustrates one braking actuator 44 provided in operative association with each of the steerable wheels 14, the work vehicle 10 may include any other suitable number of braking actuators 44. For example, in one embodiment, the work vehicle 10 may include one braking actuator 44 provided in operative association with each of the driven wheels 16 in addition to or in lieu of the steerable wheels 14.

Moreover, the work vehicle 10 may also include an exhaust treatment system 200 for reducing the amount emissions contained within the exhaust from the engine 114. For instance, engine exhaust expelled from the engine 114 may be directed through the exhaust treatment system 200 to allow the levels of nitrous oxide (NOx) emissions contained within the exhaust to be reduced significantly. The cleaned or treated exhaust gases may then be expelled from the exhaust treatment system 200 into the surrounding environment via an exhaust pipe 120 of the work vehicle 10.

It should be appreciated that the configuration of the work vehicle 10 described above and shown in FIGS. 1 and 2 is provided only to place the present subject matter in an exemplary field of use. Thus, it should be appreciated that the present subject matter may be readily adaptable to any manner of work vehicle configuration.

Figure 3:
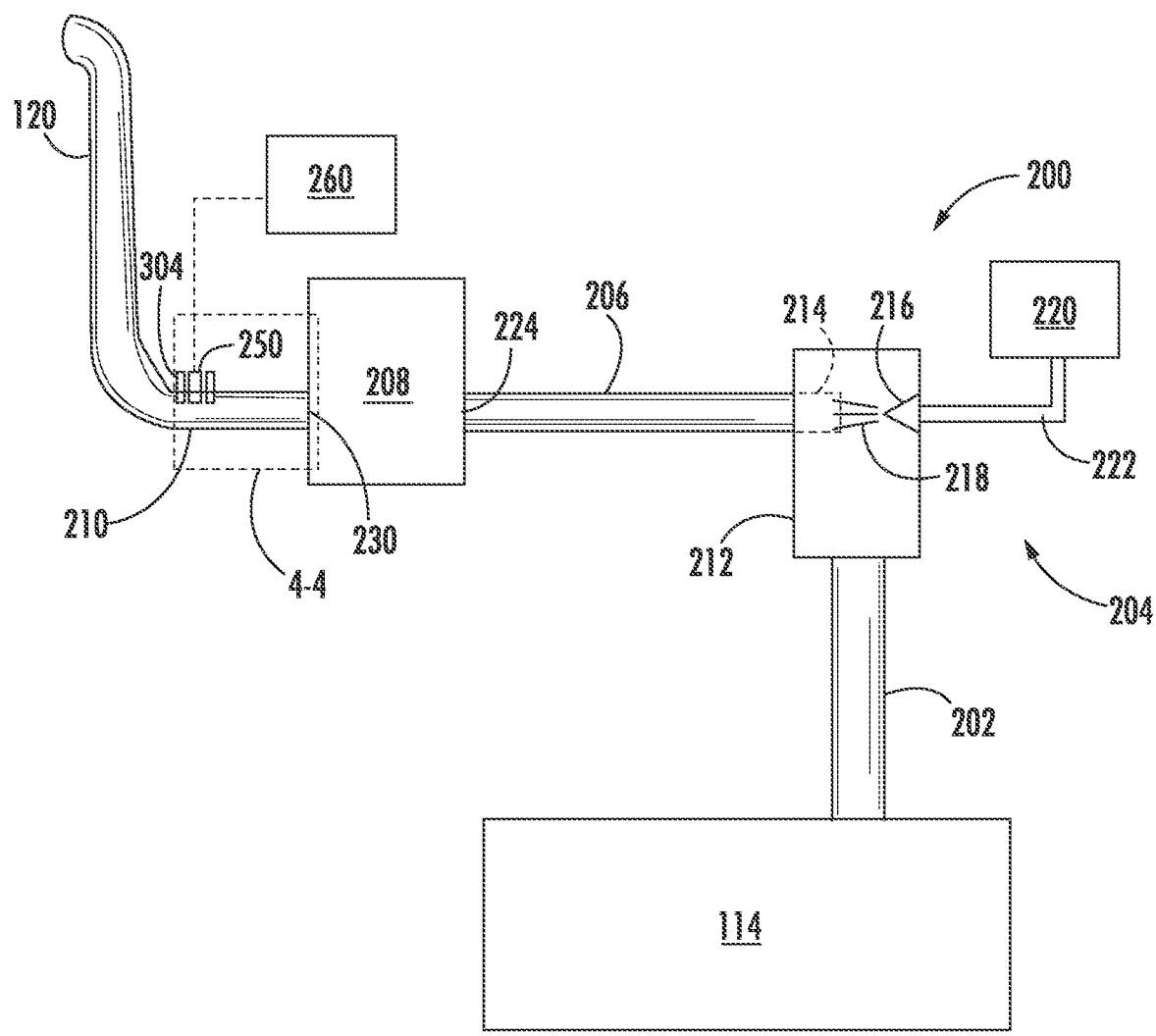
FIG. 3 illustrates a schematic view of one embodiment of an exhaust treatment system suitable for use with a work vehicle in accordance with aspects of the present subject matter.

Referring now to FIG. 3, a schematic view of one embodiment of an exhaust treatment system suitable for use with a work vehicle is illustrated in accordance with aspects of the present subject matter. As represented in FIG. 3, the exhaust treatment system 200 includes an exhaust conduit 202, a diesel oxidation catalyst (DOC) system 204, a mixing conduit 206, a selective catalytic reduction (SCR) system 208, and a treated exhaust flow conduit 210. During operation of the work vehicle 100, exhaust expelled from the engine 114 is received by the exhaust conduit 202 and flows through the conduit 202 to the DOC system 204. As is generally understood, the DOC system 204 is configured to reduce the levels of carbon monoxide and hydrocarbons present in the engine exhaust. For example, as shown in FIG. 3, the DOC system 204 includes a canister or chamber 212 for receiving engine exhaust from the exhaust conduit 202, with the chamber 212 being in flow communication with an upstream end 214 of the mixing conduit 206. In addition, the DOC system 204 includes a reductant injector nozzle 216 provided in association with the chamber 212 at a location at or adjacent to the upstream end 214 of the mixing conduit 206 to allow an exhaust reductant 218, such as a diesel exhaust fluid (DEF) or any other suitable urea-based fluid, to be injected into the stream of exhaust gases flowing through the chamber 212. For instance, as shown in FIG. 3, the reductant injector nozzle 216 may be fluidly coupled to a source of exhaust reductant (e.g., storage tank 220) via a hose or other fluid coupling 222 to allow liquid exhaust reductant 218 to be supplied to the nozzle 216.

The engine exhaust and exhaust reductant 218 flowing into the upstream end 214 of the mixing conduit 206 are then directed through the conduit 206 to the downstream end 224 thereof for receipt by the SCR system 208, within which the mixture of exhaust/reductant is reacted with a catalyst to generate a treated exhaust flow in which the amount of harmful or undesirable gas emissions has been reduced as compared to the engine exhaust initially discharged from the engine 114. In one embodiment, the SCR system 208 may define multiple catalyst lines. For instance, the SCR system 208 may house multiple SCR chambers defining, at least in part, separate catalyst lines and associated flowpaths through the SCR system 208. Furthermore, the SCR system 208 may be configured to combine and mix the treated exhaust flow from the separate catalyst lines into a total treated exhaust flow before being expelled from the SCR outlet 230 of the SCR system 208, e.g., into the downstream flow conduit 210. For instance, the SCR system 208 may include an outlet chamber positioned proximate to the SCR outlet 230 configured to promote mixing of the treated exhaust flows from separate catalyst lines. The total treated exhaust flow is then expelled from a SCR outlet 230 of the SCR system 208 and is directed through the downstream flow conduit 210 for discharge into the atmosphere (e.g., via an exhaust pipe 120 forming part of or coupled to the downstream flow conduit 210).

Additionally, as shown in FIG. 3, the exhaust treatment system 200 includes an exhaust sensor 250 positioned within the downstream flow conduit 210 to monitor the concentration or amount of emissions remaining within the exhaust flow following treatment within the SCR system 208. In one embodiment, the exhaust sensor 250 comprises one or more nitrous oxide (NOx) sensors configured to detect the amount of NOx contained within the treated exhaust flow. However, in other embodiments, the exhaust sensor 250 may comprise any other suitable sensors or combination of sensors configured to detect the concentration or amount of gaseous emissions contained within the treated exhaust flow, including the detection of gaseous emissions other than NOx and/or the detection of NOx in combination with one or more other gaseous emissions. As shown, in FIG. 3, in one embodiment, the exhaust sensor 250 is communicatively coupled to a controller 260 (e.g., a computing device or another other suitable processor-based device) configured to monitor the exhaust emissions contained within the treated exhaust flow based on the data received from the sensor 250. The controller 260 may then, for example, compare the concentration or amount of detected exhaust emissions to a predetermined limit or threshold and control one or more components of the work vehicle 10 based on such comparison, such as by adjusting the combustion temperature of the engine 114 and/or varying the amount of reductant 218 injected into the DOC system 204 to ensure that the exhaust emissions remain below a predetermined limit or threshold.

Moreover, the exhaust treatment system 200 may also include a sensor shield port 304 positioned within the downstream flow conduit 210 and configured to receive the exhaust sensor 250. As will be described in greater detail below, the sensor shield port 304 may be configured to generate turbulence within the treated exhaust flow expelled from the SCR system 208. Such turbulent flows may facilitate enhanced mixing of the treated exhaust immediately upstream of the exhaust sensor 250, thereby allowing the sensor 250 to provide more accurate data related to the concentration or amount of the gaseous emission(s) being monitored (e.g., NOx). In addition, the sensor shield port 304 may impede any water or other liquid droplets contained within the treated exhaust flow from impinging or otherwise contacting the exhaust sensor 250. Further, in certain instances, an operator of the work vehicle 10 may clean the area of the work vehicle 10 surrounding the exhaust pipe 120 and/or the downstream flow conduit 210. For example, a pressure washer may be utilized and cause water to be sprayed within the exhaust pipe 120. However, it is also envisioned that situations may arise where an operator may intentionally spray such pressurized fluid within the exhaust pipe 120. As such, the sensor shield port 304 may impede any water or other liquid droplets contained within a pressurized cleaning fluid from impinging or otherwise contacting the exhaust sensor 250.

Figure 4:
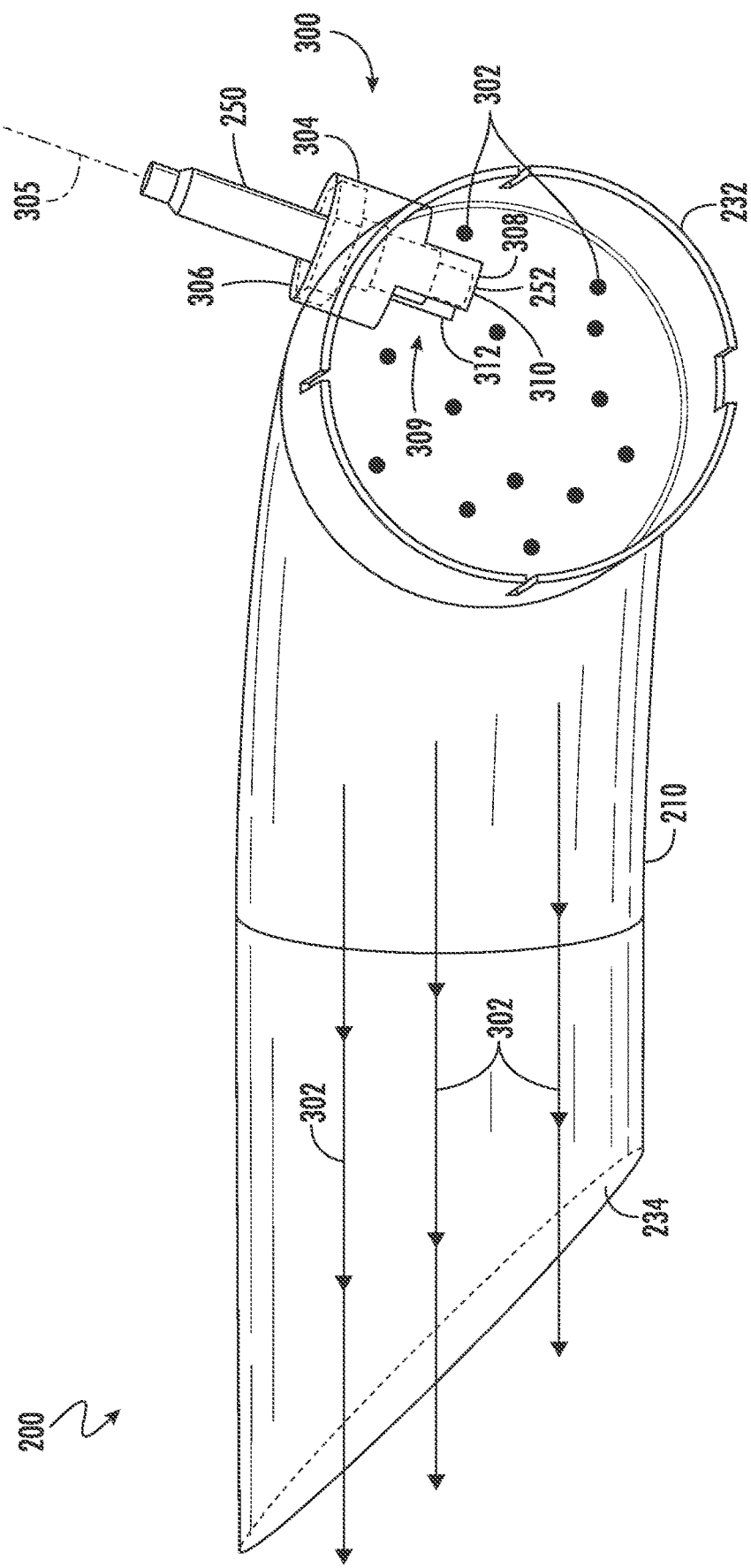
FIG. 4 illustrates a pictorial view of one embodiment of a portion of the disclosed exhaust treatment system in accordance with aspects of the present subject matter, particularly illustrating a sensor assembly including a sensor shield port within a downstream flow conduit contained within box 4-4 shown in FIG. 3.

Referring now to FIG. 4, a pictorial view of one embodiment of a portion of the exhaust treatment system 200 shown in FIG. 3 is illustrated in accordance with aspects of the present subject matter. Specifically, FIG. 4 illustrates a pictorial view of a sensor assembly 300 including a sensor shield port 304 located within the portion of the downstream flow conduit 210 contained within box 4-4 shown in FIG. 2. Particularly, FIG. 4 illustrates the sensor shield port 304 extending through a wall of the downstream flow conduit 210 and an exhaust sensor 250 positioned within the sensor shield port 304. In general, the sensor assembly 300 will be described herein with reference to the exhaust treatment system 200 and work vehicle 10 described above with reference to FIGS. 1-3. However, it should be appreciated by those of ordinary skill in the art that the disclosed sensor assembly 300 may generally be utilized with work vehicles and/or exhaust treatments systems having any other suitable work vehicle configuration and/or exhaust treatment system configuration, respectively.

In general, the sensor shield port 304 of the sensor assembly 300 surrounds the exhaust sensor 250 in order to introduce turbulence within a treated exhaust 302 proximate to the exhaust sensor 250, e.g., generating treated exhaust 302 that is more homogenously mixed as compared to the original treated exhaust 302. By more evenly mixing the treated exhaust 302, the resulting turbulent exhaust flow encountering the exhaust sensor 250 may more accurately represent the concentration or amount of emissions remaining within the treated exhaust 302. Furthermore, one or more tabs 310, 312 of the sensor shield port 304 may prevent liquid particles within the treated exhaust 302 from impinging on the exhaust sensor 250, which may prevent damage to the exhaust sensor 250 and generally increase the accuracy of the exhaust sensor 250. Additionally, the tab(s) 310, 312 may prevent particles of a pressurized fluid sprayed within the downstream exhaust conduit 210 from impinging on and preventing damage to the exhaust sensor 250. It should be appreciated that the tab(s) 310, 312 may protect the exhaust sensor 250 while reducing negative back pressure generated in association with shielding the exhaust sensor 250.

As shown in FIG. 4, the flow conduit 210 may include an upstream end 232 and a downstream end 234. For instance, the downstream end 234 may correspond to an exhaust pipe 120 forming part of or coupled to the flow conduit 210 as described above with reference to FIGS. 2 and 3. The flow conduit 210 may receive the treated exhaust 302 expelled from the SCR outlet 230 of the SCR system 208 at the upstream end 232 of the flow conduit 210 for flow towards the downstream end 234. As explained above, the treated exhaust 302 may include exhaust flow portions and/or may not be adequately mixed within an outlet chamber of the SCR system 208 before being expelled from the SCR outlet 230. As such, the exhaust sensor 250 may otherwise encounter treated exhaust 302 that may inaccurately represent the amount or concentration of harmful or undesirable gas emissions within the treated exhaust 302 as a whole, thereby potentially resulting in too much or too little reductant 218 being injected into the engine exhaust.

In order to promote more effective mixing of the treated exhaust 302 and/or to reduce the liquid particles within the exhaust encountering the exhaust sensor 250, the sensor shield port 304 is positioned within a wall of the downstream flow conduit 210 between the upstream end 232 and the downstream end 234. The sensor shield port 304 extends in a longitudinal direction defined relative to a centerline 305 between an outer end 306 and an inner end 308 of the sensor shield port 304. Thus, the sensor shield port 304 may extend through the wall of the flow conduit 210 between the inner and outer ends 308, 306 such that an inner portion 309 of the sensor shield port 304 is positioned within the flow conduit 210 between the upstream and downstream ends 232, 234.

Referring still to the portion of the exhaust system 200 illustrated in FIG. 4 and an exemplary sensor shield port 304 illustrated in FIG. 5, described in more detail below, the sensor shield port 304 may include a port body 314, an outer port wall 322, an inner port wall 324, and one or more tabs 310, 312.

The sensor shield port 304 includes the port body 314 (reference character omitted in FIG. 4 for clarity) coupled to the wall of the flow conduit 210 and positioned between the inner and outer ends 306, 308 of the sensor shield port 304. For instance, the port body 314 may be aligned with or extend along the centerline 305 of the sensor shield port 304. The port body 314 is generally configured to support the sensor shield port 304 relative to the flow conduit 310. For instance, the sensor shield port 304 may be coupled to the flow conduit 210 at the port body 314 via welding, friction fit, spin welding, flanges and associated fasteners, and/or any other suitable means known in the art. Furthermore, in certain embodiments, the sensor shield port 304 may be permanently or semipermanently coupled to the flow conduit 210 such that the sensor shield port 304 remains set in a desirable position and orientation. Thus, in one or more embodiments, the sensor shield port 304 is intended to remain fixed to the flow conduit 210 when an associated exhaust sensor 250 is removed to be cleaned, repaired, or replaced.

The sensor shield port 304 further includes the outer port wall 322 (reference character omitted in FIG. 4 for clarity) extending from the port body 314 in the longitudinal direction towards the outer end 306 of the sensor shield port 304 such that at least a portion of outer port wall 322 is positioned exterior to the flow conduit 210. The outer port wall 322 may generally protect an associated exhaust sensor 250 from incidental or unintentional contact that may damage the exhaust sensor 250 and/or alter a desirable orientation or position of the exhaust sensor 250.

An inner port wall 324 (reference character omitted in FIG. 4 for clarity) of the sensor shield port 304 extends from the port body 314 in the longitudinal direction such that at least a portion of the inner port wall 324 is positioned within an interior of the flow conduit 210. The inner port wall 324 may generally protect an associated exhaust sensor 250 from incidental or unintentional contact that may damage the exhaust sensor 250 and/or alter a desirable orientation or position of the exhaust sensor 250. Additionally, the inner port wall 324 may further shield the exhaust sensor 250 from liquid particles within the treated exhaust 302 and any particles of a pressurized liquid sprayed within the flow conduit 210. Furthermore, the inner port wall 324 may provide the structure to support the tab(s) 310, 312 of the sensor shield port 304.

As illustrated in FIG. 4, the sensor shield port 304 includes one or more tabs 310, 312 extending from the inner port wall 324 in the longitudinal direction towards the inner end 308 of the sensor shield port 304. For example, in the illustrated embodiment, the sensor shield port 304 includes an upstream tab 310 configured to be positioned and/or oriented toward the upstream end 232 of the flow conduit 310. Further, the sensor shield port 304 may include a downstream tab 312 configured to be positioned and/or oriented toward the downstream end 234 of the flow conduit 210. Furthermore, each of the tabs 310, 312 may extend from the inner port wall 324 to respective edges, at least one of which may define the inner end 308 of the sensor shield port 304.

The upstream tab 310 may generally promote mixing of the treated exhaust 302 before such exhaust encounters the exhaust sensor 250. The upstream tab 310 may be configured as a bluff body that prevents the treated exhaust 302 from flowing directly downstream from the SCR outlet 230 and impacting the exhaust sensor 250. As such, the treated exhaust 302 must turn and flow around the upstream tab 310 and into a wake area created downstream of the upstream tab 310 and immediately upstream of the exhaust sensor 250. It should be appreciated that turning the treated exhaust 302 around upstream tab 310 may introduce turbulence into such treated exhaust 302. By introducing turbulence, the treated exhaust 302 may be more thoroughly mixed within the wake area and form a more homogenously mixed treated exhaust 302 available to the exhaust sensor 250 for determining the amount of emission gas present within the treated exhaust 302.

Furthermore, the bluff body of the upstream tab 310 may provide a surface for liquid particles within the treated exhaust 302 to impinge on rather than the exhaust sensor 250. Additionally, or alternatively, turning the treated exhaust 302 around the upstream tab 310 and into the wake area may cause any liquid contained within the treated exhaust 302 to be reduced or eliminated. For instance, the treated exhaust 302 may generally accelerate in order to be turned into the wake area. Accelerating the treated exhaust 302 in such a fashion generally causes substances within the treated exhaust 302, such as liquid droplets, to be shed from the treated exhaust 302.

Specifically, the momentum of liquid droplets within the treated exhaust 302 may cause the liquid droplets to continue downstream and not turn into the wake area with the associated treated exhaust 302. Furthermore, the turbulence generated within the wake area may facilitate the primary break-up of liquid droplets contained within the treated exhaust 302 by increasing the Weber number (We) associated with the liquid droplets and also promoting the secondary break-up or atomization of the liquid droplets by reducing the characteristic atomization timescale. Such improved droplet break-up and atomization results in smaller droplet sizes within the treated exhaust 302, and the higher turbulence enhances the evaporation of the remaining droplets. Accordingly, the likelihood of liquid droplets impinging against the exhaust sensor 250 may be reduced significantly, thereby reducing the potential for sensor damage due to such liquid droplet impingements. As such, the treated exhaust 302 within the wake area may generally be more thoroughly mixed and contain fewer liquid droplets as compared to the treated exhaust 302 received within the upstream end 232 of the flow conduit 210.

Similar to the operation of the upstream tab 310, the downstream tab 312 may generally be configured as a bluff body to provide a surface for liquid particles within a pressurized fluid sprayed within the flow conduit 210 to impinge on, rather than the exhaust sensor 250. For instance, pressurized water and/or cleaning agents sprayed within the exhaust pipe 120 may impact the downstream tab 312 rather than the exhaust sensor 250 directly. It should be appreciated that avoiding pressurized liquid spray from directly impacting the exhaust sensor 250 may prevent or reduce damage and/or damage accumulation to the exhaust sensor 250. Additionally, or alternatively, the downstream tab 312 may reduce the overall contact of any such liquids with the exhaust sensor 250 and thus prevent or reduce the severity of any damage done to the exhaust sensor 250 due to thermal differences with such fluid.

As illustrated in FIG. 4, the exhaust sensor 250 is inserted within the sensor shield port 304, e.g., within a bore 320 as illustrated in and described with reference to FIG. 5 below. In one exemplary embodiment, the exhaust sensor 250 is removably coupled to the sensor shield port 304. For example, the exhaust sensor 250 may be removably coupled through corresponding threading of the exhaust sensor 250 and sensor shield port 304. Generally, the exhaust sensor 250 is inserted within the sensor shield port 304 such that the exhaust sensor 250 projects at least partially within a cross-section of the inner port wall 324. The exhaust sensor 250 may include an end 252. Thus, when the exhaust sensor 250 is inserted within the sensor shield port 304, the end 252 of the exhaust sensor 250 may be positioned downstream of the upstream tab 310 and/or upstream of the downstream tab 312. For example, in one embodiment, at a maximum insertable position of the exhaust sensor 250, the end 252 of the exhaust sensor 250 may be flush with the inner end 308 of the sensor shield port 304, such as the edge(s) of the tab(s) 310, 312. However, in alternative embodiments, the exhaust sensor 250 may be inserted within the sensor shield port 304 such that the end 252 does not extend fully to the inner end 308 of the sensor shield port 304. It should be appreciated that inserting the exhaust sensor 250 within the sensor shield port 304 fixed to the flow conduit 210 may insure a desirable orientation and position of the exhaust sensor 250 relative to the sensor shield port 304, e.g., relative to the tab(s) 310, 312. Furthermore, embodiments of the present disclosure provide the advantage of a one step process for removing and/or inserting an exhaust sensor 250 within an associated flow conduit 210. Particularly, in several embodiment, the exhaust sensor 250 may simply be threaded or otherwise removably coupled within the sensor shield port 304 without the need to assemble additional components or ensure such components are properly positioned and/or oriented relative to one another and the exhaust sensor 250. Thus, the time required to insert, remove, repair, replace, or clean associated exhaust sensors 250 may be drastically reduced.

Additionally, the disclosed sensor assembly 300 includes the exhaust sensor 250 as described generally above and arranged within the sensor shield port 304. For example, the exhaust sensor 250 may be configured to allow the concentration or amount of emissions remaining within the treated exhaust 302 to be monitored. The exhaust sensor 250 may be configured to generally extend such that at least a portion of the sensor 250 is positioned directly downstream of the upstream tab 310 and/or between the upstream tab 310 and the downstream tab 312 such that the exhaust sensor 250 is directly exposed to the treated exhaust 302 flowing within the wake area downstream of the upstream tab 310. In this regard, it should be noted that the exhaust sensor 250 may be shielded or otherwise protected from the flow of treated exhaust 302 via the upstream tab 10 and/or pressurized spray via the downstream tab 312. As such, treated exhaust 302 containing fewer liquid droplets and/or more thoroughly mixed exhaust gases may flow across the exhaust sensor 250 to allow the sensor 250 to provide accurate data relating to the gaseous emission(s) being monitored. Furthermore, the controller 260 (FIG. 3) may implement a control action, such as adjusting the combustion temperature of the engine 114 and/or varying the amount of reductant 218 injected into the DOC system 204, based on a more accurately determined amount of exhaust emissions contained within the treated exhaust 302.

Figure 5:
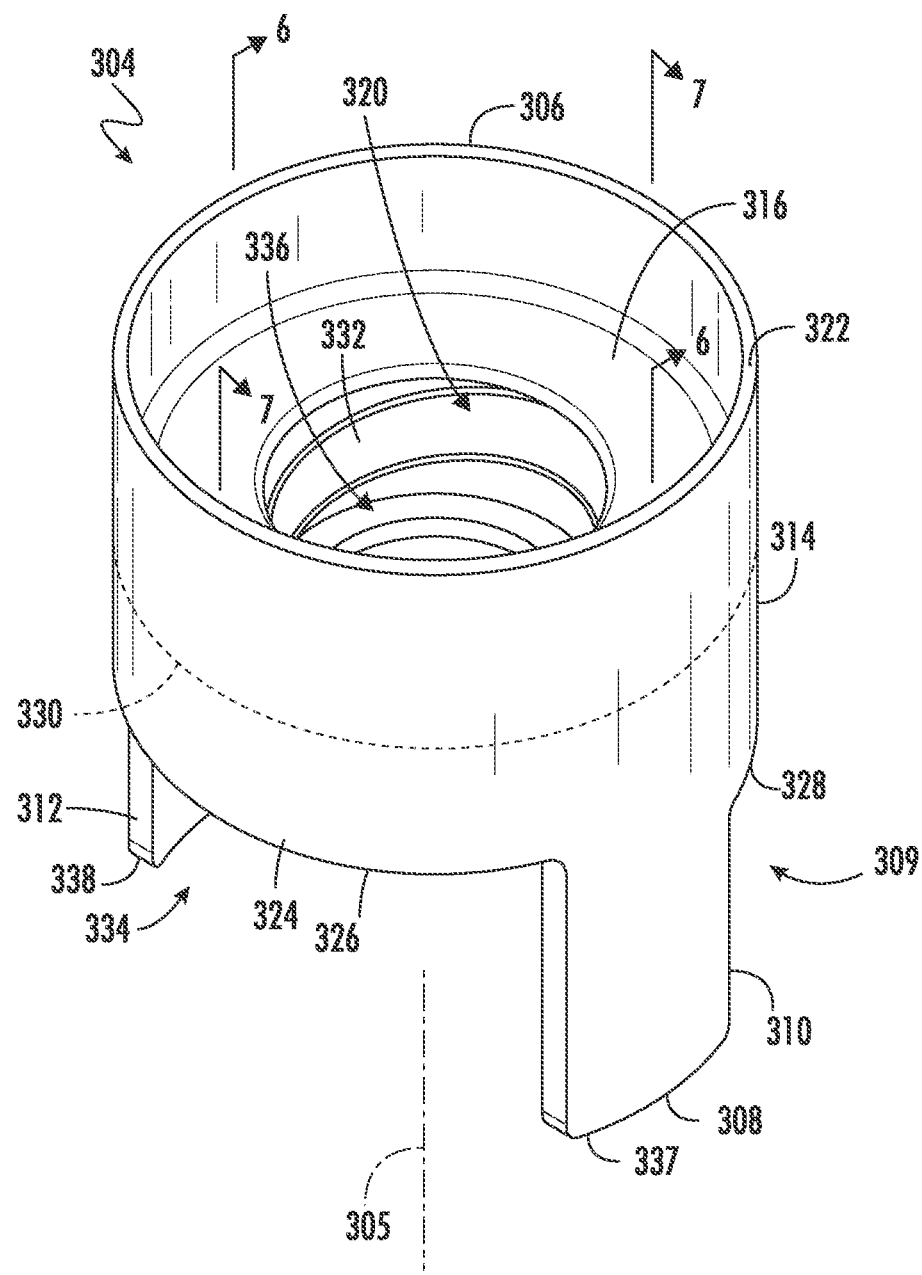
FIG. 5 illustrates a pictorial view of one embodiment of a sensor shield port of a sensor assembly suitable for use within the disclosed exhaust treatment system in accordance with aspects of the present subject matter.

Referring now to FIG. 5, a pictorial view of one embodiment of the sensor shield port 304 described above with reference to FIG. 4 is illustrated in accordance with aspects of the present subject matter. Particularly, FIG. 5 illustrates an associated bore 320 and the internal structure of the sensor shield port 304. It should be appreciated that aspects of the depicted sensor shield port 304 may be utilized within any suitable exhaust treatment system of a given work vehicle. The sensor shield port 304 of FIG. 5 may generally be configured the same as or similar to the sensor shield port 304 of FIG. 4. For instance, sensor shield port 304 may extend in a longitudinal direction relative to a centerline 305 between an outer end 306 and an inner end 308. The sensor shield port 304 may include a port body 314, an outer port wall 322, an inner port wall 324, an upstream tab 310, and/or a downstream tab 312. Further, the sensor shield port 304 may be configured to introduce turbulence within the treated exhaust 302, provide a bluff body for impingement of liquid particles within the treated exhaust 302, reduce the amount of liquid particles within such engine exhaust 302, and/or provide a bluff body for impingement of liquid particles sprayed within an associated exhaust pipe 120. Furthermore, a sensor shield port 304 include one or more tabs 310, 312 may produce less back pressure within an associate exhaust treatment system 200 compared to other sensor shields. In one or more embodiments, the sensor shield port 304 may allow for an associated exhaust sensor to be removably coupled to the sensor shield port 304 without the need to assembly additional components of a shield and/or orient such exhaust sensor relative to the sensor shield port 304, thus allowing easier insertion, removal, cleaning, and/or repair of exhaust sensors associated with the exhaust treatment system 200.

As shown in FIG. 5, the port body 314 extends in the longitudinal direction from an outer surface 316 to an inner surface 318 (obstructed in FIG. 5 but shown in FIGS. 6 and 7) opposite the outer surface 316. The port body may define a bore 320 extending along the longitudinal direction from the outer surface 316 to the inner surface 318. As such, the port body 314 may receive an associated exhaust sensor as described in detail above with respect to FIG. 4. For instance, as shown in FIG. 5, the port body 304 may include threading 332 that allows the port body 302 to be removably coupled with corresponding threading of the associated exhaust sensor. In one embodiment, as illustrated, the sensor shield port 304 may include a stop 336 circumscribing the bore 320 and positioned proximate to the inner surface 318 of the port body 314. However, in alternative embodiments, the stop 336 may be located within the bore 320 at any location between the outer surface 316 and the inner surface 318. Generally, the stop 336 may contact a corresponding surface of the exhaust sensor in order to prevent the exhaust sensor from being inserted further than desired within the bore 320 along the longitudinal direction toward the inner surface 308 of the sensor shield port 304. Thus, the stop 336 may set a maximum insertable position of an associated exhaust sensor along the longitudinal direction. As illustrated, the port body 314 may define a perimeter 330. For instance, the perimeter 330 is defined on a plane perpendicular to the longitudinal direction. In the illustrated embodiment, the perimeter 330 defines a circular cross-section. Thus, the sensor shield port 304 may generally define a circular cross-section. It should be appreciated that in alternative embodiments the perimeter 330 of the port body 314 and/or the sensor shield port 304 may define any other suitable cross-sectional shape.

As also shown in the exemplary embodiment of FIG. 5, the outer port wall 322 of the sensor shield port 302 may generally extend from the outer surface 316 of the port body 314 in the longitudinal direction towards the outer end 306 of the sensor shield port 302. In one or more embodiments, the outer port wall 322 may define the outer end 306 of the sensor shield port 302. Thus, when coupled to a flow conduit 210 as shown in FIG. 4, at least a portion of the outer port wall 322 may be positioned exterior to the flow conduit 210. In one embodiment, as illustrated, the outer port wall 322 may extend from the port body 314 at the perimeter 330 of the port body 314. As such, the outer port wall 322 may define the same or similar cross-section shape as the port body 314, such as a circular cross-sectional shape. In one or more embodiments, the outer port wall 322 may be formed integrally with or on the port body 314. For example, the outer port wall 322 may be cast with the port body 314, formed utilizing additive manufacturing with the port body 314, welded to the port body 314, adhered to the port body 314, or the like.

In the illustrated embodiment of FIG. 5, the inner port wall 324 generally extends from the inner surface 318 of the port body 314 in the longitudinal direction towards the inner end 308 of the sensor shield port 302. As illustrated in FIG. 4, when coupled to the flow conduit 210, at least a portion of the inner port wall 324 may be positioned within an interior of the flow conduit 210. Similar to the outer port wall 322, the inner port wall 324 may extend from the port body 314 at the perimeter 330 of the port body 314. As such, the inner port wall 324 may define the same or similar cross-section shape as the port body 314, such as a circular cross-sectional shape. In one or more embodiments, the outer port wall 322 may be formed integrally with or on the port body 314. For example, the inner port wall 324 may be cast with the port body 314, formed utilizing additive manufacturing with the port body 314, welded to the port body 314, adhered to the port body 314, or the like. As shown in FIG. 5, the inner port wall 324 may define sections between tabs 310, 312 of the sensor shield port 304. For instance, the inner port wall 324 of FIG. 5 defines a first portion 326 extending between the upstream tab 310 and the downstream tab 312 and a second portion 328 extending on an opposite side of the inner port wall 324 between the downstream tab 312 and the upstream tab 310. However, in embodiments with more than two tabs 310, 312, the inner port wall 324 may define additional portions, such as one less portion than the number of tabs.

Referring still to the embodiment of FIG. 5, the tabs 310 and 312 may extend from the inner port wall 324 in the longitudinal direction toward the inner end 308 of the sensor shield port 304. For example, in the illustrated embodiment, either or both of respective edges 337, 338 of the tab(s) 310, 312 may define the inner end 308 of the sensor shield port 304. While the embodiment of FIG. 5 is illustrated with two tabs 310, 312, it should be appreciated that alternative embodiments may include one tab or additional tabs, such as three or more tabs. Referring briefly also to the embodiment of FIG. 4, the upstream tab 310 may oriented toward the upstream end 232 of the flow conduit 210 and/or the downstream tab 312 may be oriented toward the downstream end 234 of the flow conduit 210. Thus, as shown in FIG. 5, the tabs 310, 312 may be transversely oriented relative to each other with respect to the cross-section of the inner port wall 324. In the illustrated embodiment, the tabs 310, 312 extend along portions of the perimeter 330 of the port body 314. However, in alternative embodiments, the tabs 310, 312 may truncate the perimeter 330 of the port body 314. Furthermore, while the tabs 310, 312 of FIG. 5 are depicted as curved rectangular shapes, it should be appreciated that the tabs 310, 312 may define any suitable shape desired or required. As examples, one or more of the tabs 310, 312 may define partially circular, arced, triangular, tapered, or other shapes. Thus, while the edges 337, 338 of the tabs 310, 312 are depicted as having a constant position along the longitudinal direction, the tabs 310, 312 may have edges extending at least partially along the longitudinal direction in alternative embodiments. In one or more embodiments, the tab(s) 310, 312 may be formed integrally with or on the inner port wall 324. For example, the tab(s) 310, 312 may be cast with the inner port wall 324, formed utilizing additive manufacturing with the inner port wall 324, welded to the inner port wall 324, adhered to the inner port wall 324, or the like.

Figure 6:
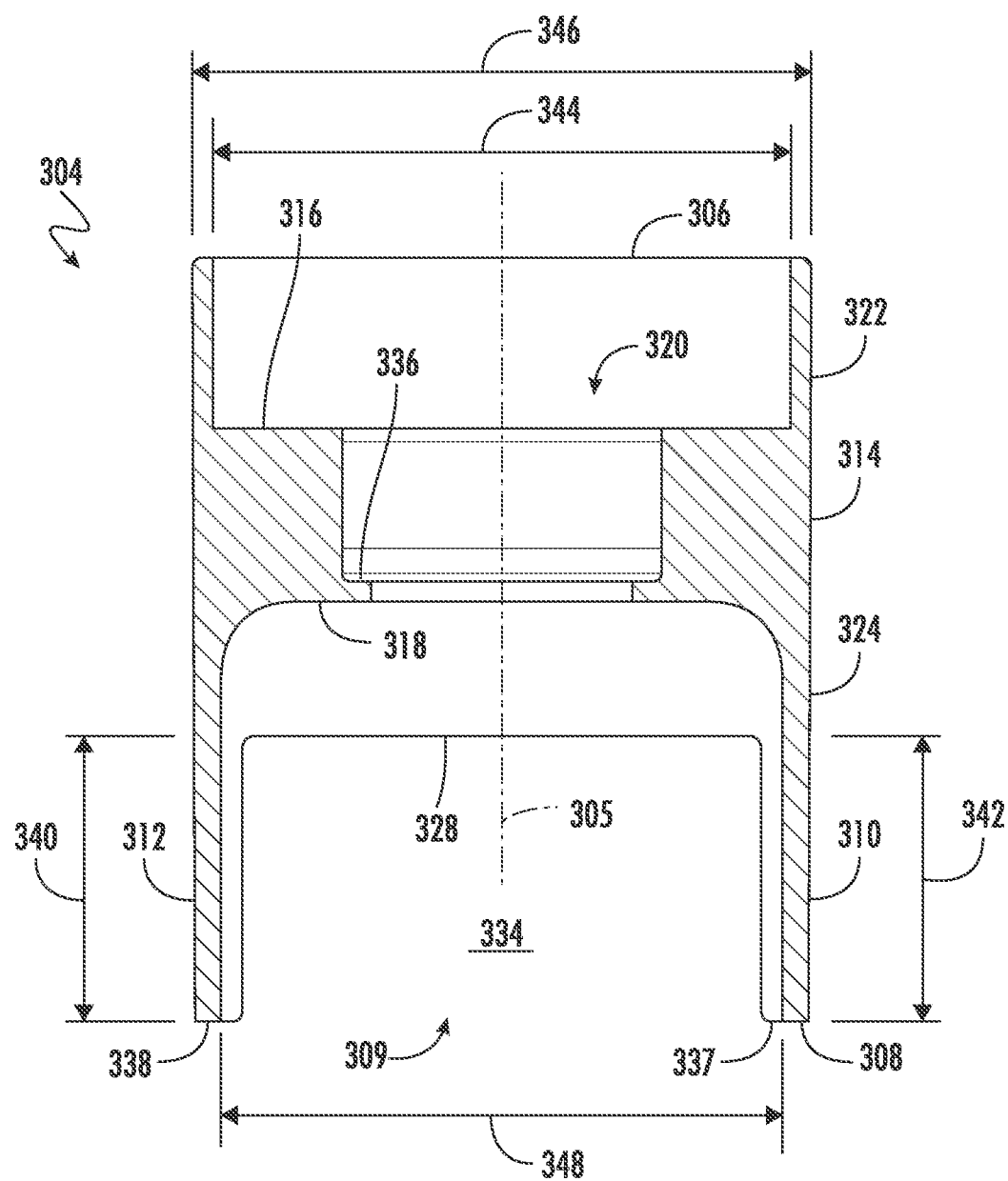
FIG. 6 illustrates a cross-sectional view of one embodiment of a sensor shield port suitable for use with the disclosed sensor assembly, particularly illustrating a view of a sensor shield port taken along section line 6-6 of FIG. 5.
Figure 7:
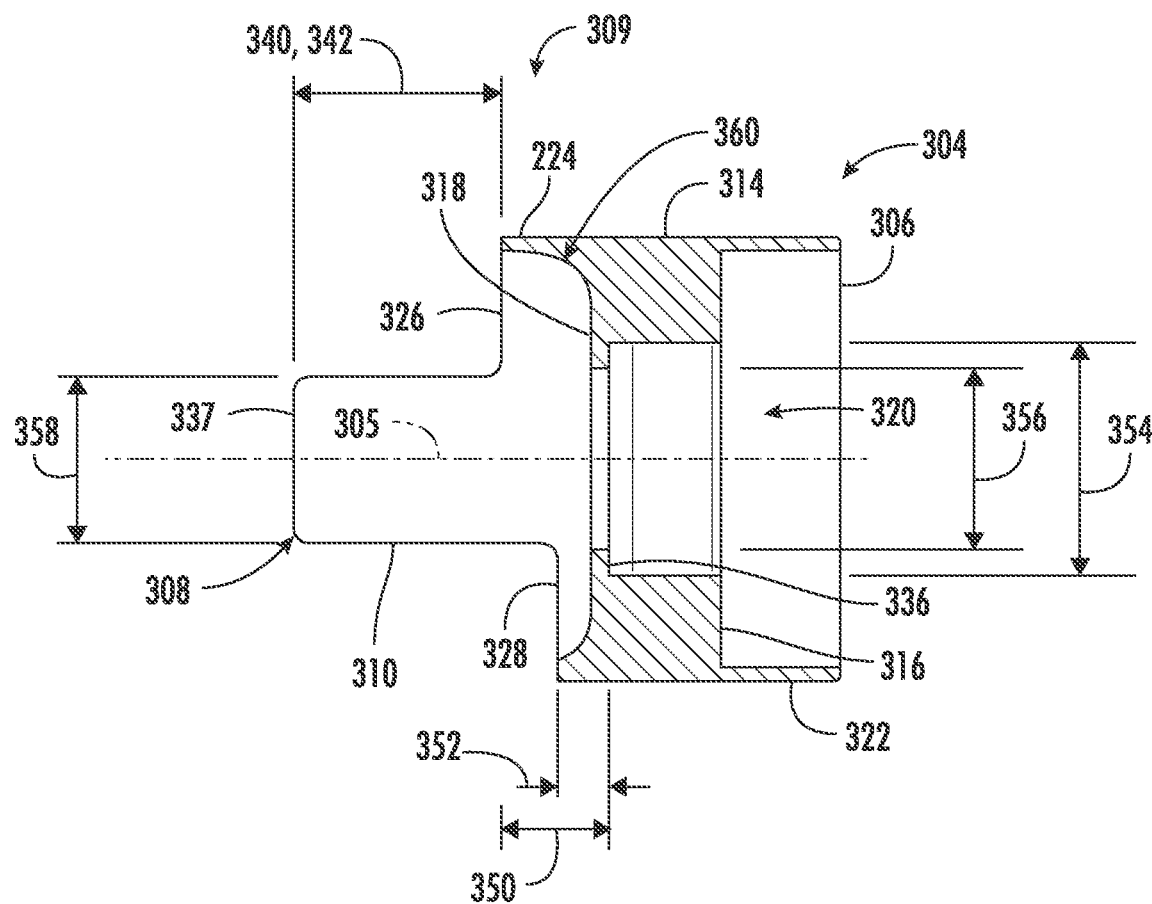
FIG. 7 illustrates another cross-sectional view of one embodiment of a sensor shield port suitable for use with the disclosed sensor assembly, particularly illustrating a view of a sensor shield port taken along section line 7-7 of FIG. 5.

Referring now to FIGS. 6 and 7, multiple cross-sectional views of the embodiment of the sensor shield port 304 of FIG. 5 are illustrated in accordance with aspects of the present subject matter. Particularly, FIG. 6 illustrates a cross-sectional view of an exemplary sensor shield port 304 taken along section line 6-6 of FIG. 5, and FIG. 7 illustrates a cross-sectional view of an exemplary sensor shield port 304 taken along section line 7-7 of FIG. 5. While the embodiments of FIGS. 6-7 are illustrated and described in the context of the sensor shield port 304 described with reference to FIGS. 4 and 5, it should be appreciated the aspects of the depicted sensor shield port 304 may be utilized in association with sensor shield ports and exhaust sensor assemblies suitable for use in any appropriate exhaust treatment system.

As shown particularly in the illustrated sensor shield port 304 of FIG. 6, the upstream tab 310 and downstream tab 312 may each define lengths 342, 340 along the longitudinal direction from the inner port wall 324 to respective edges 337, 338 of the tabs 310, 312. As shown, the lengths 340, 342 may be the same or approximately the same. However, in alternative embodiments, the lengths 340, 342 may be different. As further shown in FIG. 6, each of the port body 314, outer port wall 322, and inner port wall 324 may define a cross-sectional dimension (such as diameters 344, 346, 346 of a circular shaped sensor shield port 304). Further, as illustrated, in at least one embodiment, the diameter 344 of the port body 314, the diameter 346 of the outer port wall 322, and the diameter 348 of the inner port wall 324 may be the same. However, in alternative embodiment, the diameter(s) 344, 346, 348 of any of any of or all of the port body 314, outer port wall 322, or the inner port wall 324 may change along the longitudinal direction. Further, through the tabs 310, 312 are illustrated as extending parallel to the longitudinal direction in FIG. 6, in alternative embodiments, one or both of the tabs 310, 312 may expand or converge relative to the centerline 305 as the tabs 310 extend from the inner port wall 324 to their respective edges 337, 338.

As shown particularly in the illustrated sensor shield port 304 of FIG. 7, the first portion 326 and the second portion 328 of the inner port wall 324 may define lengths 350 and 352 along the longitudinal direction from the inner surface 318 of the port body 314. In the embodiment of FIG. 7, length 350 of the first portion of the inner port wall 324 is longer than the length 352 of the second portion 328 of the inner port wall 324. However, in other embodiments, the length 352 of the second portion 328 of the inner port wall may be longer than the length 350 of the first portion of the inner port wall 324. Still, in further embodiments, such lengths 350, 352 may be the same or approximately the same.

FIG. 7 further illustrates one embodiment of the stop 336. In the depicted embodiment, the stop 336 may be a section of the bore 320 defining a diameter 356 smaller than a diameter 354 of the rest of the bore 320. Thus, the stop 336 may interface with a lip of an associated exhaust sensor to prevent the exhaust sensor from being inserted into the sensor shield port 304 past a desirable position associated with the stop 336. Furthermore, the diameter 346 of the outer port wall 322 may be sized large enough relative to the diameter 354 of the bore 320 in order to provide room such that tools utilized to removably coupled an associated exhaust sensor may be easily employed.

The embodiment of FIG. 7 further illustrates a circumferential width 358 of the upstream tab 310. In several embodiments, the circumferential width 358 of the upstream tab 310 may be between 10% and 30% of the perimeter 330 of the port body 312. Additionally, a circumferential width of the downstream tab 312 (not shown in FIG. 7) may be the same or approximately the same as the circumferential width 358 of the upstream tab 310. However, in alternative embodiments, the circumferential width of the downstream tab 312 may be wider or narrower than the circumferential width 358 of the upstream tab 310. In one embodiment, as illustrated in FIG. 7, an internal interface 360 between the port body 314 and the inner port wall 324 may be curved in order to promote further mixing of treated exhaust encountering an associated exhaust sensor.

The present disclosure is also directed to corresponding methods of positioning an exhaust sensor within a flow conduit of an exhaust treatment system of a work vehicle. In general, such methods will be described herein with reference to the work vehicle 10, the exhaust treatment system 200, sensor assembly 300, sensor shield port 304, and exhaust sensor 250 described herein with reference to FIGS. 1-7. However, it should be appreciated by those of ordinary skill in the art that the disclosed methods may generally be utilized in association with work vehicles, exhaust treatment systems, and exhaust sensors having any suitable configuration and/or as part of a system having any suitable system configuration. In addition, although steps are described as performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In one embodiment, such a method may include determining a location along the flow conduit 210 between the upstream end 232 and the downstream end 234 corresponding to a lower moisture content of the treated exhaust 302. For instance, such location may be determined empirically utilizing one or more appropriate sensors, indicators, or the like. Additionally, or alternatively, such location may be determined via modeling of the exhaust treatment system 200. For instance, a computational fluid dynamic model may be utilized to determine the location along the flow conduit 210 corresponding to a lower moisture content of the treated exhaust 302. The method may also include forming a hole within a wall of the flow conduit 210 at the determined location of the lower moisture content of the treated exhaust 302. As one example, such hole may be machined within the flow conduit 210, such as via drilling or cutting of the flow conduit 210. Alternatively, the flow conduit 210 may be formed with such hole at the determined location.

In one embodiment, the method may include coupling the sensor shield port 304 within a hole of the fluid conduit 210 at a location between the upstream and downstream ends 232, 234, such as at the determined location of the lower moisture content of the treated exhaust 302. In one instance, the sensor shield port 304 may be coupled to the flow conduit 210 at the port body 314 utilizing one or more of welding, friction fit, spin welding, flanges and associated fasteners, and/or any other suitable means known in the art. In one embodiment, the sensor shield port 304 may be coupled to the fluid conduit 210 such that the outer port wall 322 projects from the flow conduit 210. In an additional or alternative embodiment, the sensor shield port 304 may be coupled to the flow conduit 210 such that the inner port wall 324 projects within the interior of the flow conduit 210. In one instance, coupling the sensor shield port 304 within the hole of the fluid conduit 210 may include orienting the sensor shield port 304 within the hole such that the upstream tab 310 is oriented to face toward the upstream end 232 of the fluid conduit 210. Additionally, or alternatively, coupling the sensor shield port 304 within the hole of the fluid conduit 210 may include orienting the sensor shield port 304 within the hole such that the downstream tab 312 is oriented to face toward the downstream end 234 of the fluid conduit 210.

The method may also include inserting and removably coupling an exhaust sensor within a bore of a sensor shield port. For example, the exhaust sensor 250 may be inserted into the bore 320 of the sensor shield port 304 and rotated such that threads of the exhaust sensor 250 and complementary threads within the bore 320 couple the sensor 250 and exhaust sensor port 304 together. Further, the exhaust sensor 250 may be rotated an opposite direction to remove the exhaust sensor 250 from the sensor shield port 304. As such, the exhaust sensor 250 may be inserted and removably coupled within the sensor shield port 250 such that the exhaust sensor 250 projects at least partially within a cross-section of the inner port wall 324.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed:

1. A sensor assembly for use within a flow conduit of an exhaust treatment system of a work vehicle, the flow conduit including an upstream end and a downstream end, the flow conduit configured to receive a treated exhaust at the upstream end for flow towards the downstream end, the sensor assembly comprising:

a sensor shield port extending in a longitudinal direction between an inner end of the sensor shield port and an outer end of the sensor shield port, the sensor shield port extending through a wall of the flow conduit between the inner and outer ends such that an inner portion of the sensor shield port is positioned within the flow conduit at a location between the upstream and downstream ends, the sensor shield port comprising:

a port body coupled to the wall of the flow conduit and extending in the longitudinal direction from an outer surface of the port body to an inner surface of the part body, the port body defining a bore extending in the longitudinal direction from the outer surface to the inner surface an outer port wall extending from the outer surface of the port body in the longitudinal direction towards the outer end of the sensor shield port such that at least a portion of the outer port wall is positioned exterior of the flow conduit;

an inner port wall extending from the inner surface of the port body in the longitudinal direction such that at least a portion of the inner port wall is positioned within an interior of the flow conduit; and at least one tab extending from the inner port wall in the longitudinal direction towards the inner end of the sensor shield port; and an exhaust sensor inserted within the bore of the sensor shield port, the exhaust sensor removably coupled to the sensor shield port at the bore, wherein the exhaust sensor is configured to detect an amount of an emission gas present in the treated exhaust.

2. The sensor assembly of claim 1, wherein the at least one tab comprises a first tab and a second tab extending from the inner port wall in the longitudinal direction towards the inner end of the sensor shield port.

3. The sensor assembly of claim 2, wherein the first tab and the second tab each extend from the inner port wall such that the first and second tabs are transversely oriented relative to each with respect to a cross-section of the inner port wall, and wherein the first tab is positioned toward the upstream end of the flow conduit and the second tab is positioned toward the downstream end of the flow conduit.

4. The sensor assembly of claim 2, wherein the first tab and the second tab each define a length along the longitudinal direction, the lengths of the first tab and the second tab being the same.

5. The sensor assembly of claim 2, wherein the inner wall defines a first portion extending between the first tab and the second tab and a second portion opposite the first portion extending between the first tab and the second tab, and wherein first portion extends farther along the longitudinal direction from the inner surface of the port body than the second portion.

6. The sensor assembly of claim 1, wherein the outer port wall is integrally formed with the port body.

7. The sensor assembly of claim 1, wherein the port body defines a perimeter relative to the centerline, and wherein the outer port wall extends from the perimeter of the port body.

8. The sensor assembly of claim 1, wherein the inner port wall is integrally formed with the port body.

9. The sensor assembly of claim 1, wherein the port body defines a perimeter relative to the centerline, and wherein the inner port wall extends from the perimeter of the port body.

10. The sensor assembly of claim 9, wherein the at least one tab defines a circumferential width along the inner port wall between 10% and 30% of the perimeter.

11. The sensor assembly of claim 1, wherein the exhaust sensor is removably coupled to the sensor shield port via a threaded connection.

12. The sensor assembly of claim 1, wherein the port body is welded to the wall of the flow conduit.

13. The sensor assembly of claim 1, wherein the exhaust sensor is inserted into the bore such that the exhaust sensor projects at least partially within a cross-section of the inner port wall.

14. The sensor assembly of claim 1, wherein the sensor shield port further comprises:
a stop circumscribing the bore and positioned proximate to the inner surface of the port body, wherein a maximum insertable position of the exhaust sensor along the longitudinal direction is set by the stop.

15. The sensor assembly of claim 13, wherein the exhaust sensor includes an end and the at least one tab extends from the inner port wall along the longitudinal direction to an edge, and wherein, at the maximum insertable position of the exhaust sensor, the end of the exhaust sensor is flush with the edge of the at least one tab.

16. The sensor assembly of claim 10, wherein the exhaust sensor is a nitrous oxide (NOx) sensor.

17. An exhaust treatment system for a work vehicle, the system comprising:
a selective catalytic reduction (SCR) system configured to react a mixture of exhaust reductant and engine exhaust with a catalyst to generate a treated exhaust, the SCR system including an SCR outlet for expelling the treated exhaust therefrom;
a flow conduit including an upstream end and a downstream end, the flow conduit in fluid communication with the SCR outlet for receiving the treated exhaust expelled from the SCR system;
a sensor shield port extending in a longitudinal direction between an inner end of the sensor shield port and an outer end of the sensor shield port, the sensor shield port extending through a wall of the flow conduit between the inner and outer ends such that an inner portion of the sensor shield port is positioned within the flow conduit at a location between the upstream and downstream ends, the sensor shield port comprising:
a port body coupled to the wall of the flow conduit and extending in the longitudinal direction from an outer surface of the port body to an inner surface of the part body, the port body defining a bore extending in the longitudinal direction from the outer surface to the inner surface;
an outer port wall extending from the outer surface of the port body in the longitudinal direction towards the outer end of the sensor shield port such that at least a portion of the outer port wall is positioned exterior of the flow conduit;
an inner port wall extending from the inner surface of the port body in the longitudinal direction such that at least a portion of the inner port wall is positioned within an interior of the flow conduit; and
at least one tab extending from the inner port wall in the longitudinal direction towards the inner end of the sensor shield port; and
an exhaust sensor inserted within the bore of the sensor shield port, the exhaust sensor removably coupled to the sensor shield port at the bore, wherein the exhaust sensor is configured to detect an amount of an emission gas present in the treated exhaust.

18. The exhaust treatment system of claim 17, wherein the at least one tab comprises a first tab and a second tab extending from the inner port wall in the longitudinal direction towards the inner end of the sensor shield port such that the first and second tabs are transversely oriented relative to each with respect to a cross-section of the inner port wall, and wherein the first tab is positioned toward the upstream end of the flow conduit and the second tab is positioned toward the downstream end of the flow conduit.

19. The exhaust treatment system of claim 17, wherein the outer port wall and inner port wall are each integrally formed with the port body.

20. The exhaust treatment system of claim 16, wherein the port body defines a perimeter relative to the centerline, and wherein the outer port wall and inner port wall each extend from the perimeter of the port body.

* * * * *